United States Patent
Stanhope (10) Patent No.: US 10,883,616 B2
(45) Date of Patent: Jan. 5, 2021

(54) CONTROL VALVE FOR CAM PHASER AND METHOD FOR MOUNTING THE CONTROL VALVE

(71) Applicant: ECO Holding 1 GmbH, Marktheidenfeld (DE)

(72) Inventor: Daniel Stanhope, Nunica, MI (US)

(73) Assignee: ECO Holding 1 GmbH, Marktheidenfeld (DE)

( * ) Notice: Subject to any disclaimer, the term of this patent is extended or adjusted under 35 U.S.C. 154(b) by 18 days.

(21) Appl. No.: 16/269,137

(22) Filed: Feb. 6, 2019

(65) Prior Publication Data

US 2020/0248822 A1    Aug. 6, 2020

(51) Int. Cl.
*F16K 11/07* (2006.01)
*F01L 1/344* (2006.01)

(52) U.S. Cl.
CPC ........ *F16K 11/0716* (2013.01); *F01L 1/3442* (2013.01); *F01L 2001/34426* (2013.01); *Y10T 137/86702* (2015.04)

(58) Field of Classification Search
CPC ..... F01L 2001/34426; F01L 2001/3443; F01L 2001/34433; F01L 1/3442; F01L 2001/3445; F01L 1/047; F01L 1/46; F01L 1/34–3442; F01L 1/348; F01L 1/352; F01L 1/356; F01L 2001/34423–34496; F01L 2001/3521; F01L 2001/3522; F16K 11/0716; F16K 11/0708; F16K 11/0704; F16K 11/0712; Y10T 137/86493; Y10T 137/86574; Y10T 137/8667; Y10T 137/86694; Y10T 137/86702

USPC .......................................... 123/90.17, 90.15
See application file for complete search history.

(56) References Cited

U.S. PATENT DOCUMENTS

| | | | | |
|---|---|---|---|---|
| 3,164,168 | A * | 1/1965 | Bradley | F02M 1/00 137/544 |
| 8,662,040 | B2 * | 3/2014 | Knecht | F01L 1/3442 123/90.15 |
| 9,322,419 | B2 * | 4/2016 | Hutzelmann | F01L 1/3442 |
| 9,695,716 | B2 * | 7/2017 | Smith | F01L 1/34409 |
| 9,784,143 | B2 * | 10/2017 | Snyder | F01L 1/3442 |

(Continued)

FOREIGN PATENT DOCUMENTS

DE     102013104575     11/2014

OTHER PUBLICATIONS

US 10,626,761 B1, 04/2020, Fischer (withdrawn)*

*Primary Examiner* — Craig J Price
(74) *Attorney, Agent, or Firm* — Von Rohrscheidt Patents (57) ABSTRACT

A control valve for a cam phaser of an internal combustion engine, the control valve including a cylindrical housing, including a first operating connection, a second operating connection, a supply connection, and a tank drain connection configured to drain a hydraulic fluid; a control piston device, including a control piston, a piston shaft, a first check valve, and a second check valve; wherein the control piston device is arranged in the housing and movable by an actuator in an axial direction of the housing, wherein the first check valve is configured with a first piston disc and the second check valve is configured with a second piston disc and the first piston disc and the second piston disc are arranged offset from each other by a torsion spring so that a control chamber is formed between the first piston disc and the second piston disc.

13 Claims, 6 Drawing Sheets

(56) References Cited

U.S. PATENT DOCUMENTS

| | | | | |
|---|---|---|---|---|
| 9,816,408 B2* | 11/2017 | Haltiner, Jr. | | F01L 1/3442 |
| 10,113,451 B2* | 10/2018 | Stanhope | | F01L 1/3442 |
| 10,240,493 B2* | 3/2019 | Nance | | F01L 1/047 |
| 10,612,430 B2* | 4/2020 | Stanhope | | F01L 1/047 |
| 2012/0073535 A1* | 3/2012 | Hoppe | | F01L 1/3442 |
| | | | | 123/188.4 |
| 2014/0311333 A1* | 10/2014 | Hutzelmann | | F01L 1/3442 |
| | | | | 91/418 |
| 2016/0010515 A1* | 1/2016 | Snyder | | F01L 1/3442 |
| | | | | 123/90.15 |
| 2016/0123483 A1* | 5/2016 | Fudge | | F16K 15/063 |
| | | | | 137/512 |
| 2017/0260884 A1* | 9/2017 | Nance | | F01L 1/047 |
| 2019/0093524 A1* | 3/2019 | Sing | | F16J 1/09 |
| 2019/0257222 A1* | 8/2019 | Stanhope | | F01L 1/3442 |
| 2019/0257223 A1* | 8/2019 | Diederichs | | F01L 1/3442 |
| 2019/0257224 A1* | 8/2019 | Bartel | | F01L 1/02 |

* cited by examiner

CONTROL VALVE FOR CAM PHASER AND METHOD FOR MOUNTING THE CONTROL VALVE

FIELD OF THE INVENTION

The invention relates to a control valve for a cam phaser and a method for mounting the control valve.

BACKGROUND OF THE INVENTION

Cam phasers are used in valve trains of internal combustion engines in order to be able to variably adjust a phase relationship between the crankshaft and the camshaft in an optimum manner. Thus, control valves or hydraulic valves are being used to control a fluid flow between the cam phaser and a reservoir or tank. Control valves of this type have plural switching positions that facilitate adjusting a path of a fluid flow. Thus, an adjustment of the cam phaser and thus of the camshaft into a predetermined phase orientation is performed as a function of a switching position.

Generic art is well known. DE 10 2013 104 575 A1 illustrates a hydraulic valve for a cam phaser which includes a sleeve element with a longitudinal channel, a first transversal channel that branches off from the longitudinal channel and a second transversal channel that branches off from the longitudinal channel and a pressure balanced hollow piston that is arranged axially moveable within the longitudinal channel between a first end position and a second end position. Thus, the longitudinal channel has a first channel section with a greater inner diameter and a second channel section with a smaller inner diameter, wherein the first transversal channel originates from the first channel section and the second transversal channel originates from the second channel section. Thus, the hollow piston includes a longitudinal channel with an axial opening, at least one transversal channel, a first piston section with a greater external diameter, and a second piston section with a smaller external diameter, wherein the hollow piston is supported with sealing tolerance at its first piston section at the first channel section of the longitudinal channel and with its second piston section with a sealing tolerance at the second channel section of the longitudinal channel.

BRIEF SUMMARY OF THE INVENTION

It is an object of the invention to improve the control valve recited supra and to simplify its assembly.

According to one aspect of the invention, the object is achieved by a control valve for a cam phaser of an internal combustion engine, the control valve including a cylindrical housing, including a first operating connection, a second operating connection, a supply connection, and a tank drain connection configured to drain a hydraulic fluid; a control piston device, including a control piston, a piston shaft, a first check valve, and a second check valve, wherein the control piston device is arranged in the housing and movable by an actuator in an axial direction of the housing, wherein the first check valve is configured with a first piston disc and the second check valve is configured with a second piston disc and the first piston disc and the second piston disc are arranged offset from each other by a torsion spring so that a control chamber is formed between the first piston disc and the second piston disc, wherein the first piston disc and the second piston disc are respectively configured with at least two support elements, wherein the at least two support elements extend in the axial direction from a side of the first piston disc and the second piston disc that is respectively oriented away from the control chamber, and wherein the at least two support elements support a linear movement of the first piston disc and the second piston disc in the control piston.

Advantageous embodiments are provided in the independent claims.

The improved control valve has the advantage of combining a simple and cost-effective configuration with a particularly quick cam shaft adjustment. This is achieved in particular in that the piston discs are particularly well supportable by the support elements in the control piston. This optimized design prevents a tilting or wedging of the piston discs and prevents wear of the check valves. Thus the control valve according to the invention is configured very short or compact in the axial direction which saves space in the joint arrangement with the cam phaser and provides space for new functional components as required.

The support elements are advantageously provided with a special geometry wherein the support elements are configured with flat walls that are advantageously integrally connected in one piece with the piston disc and a disc support cylinder. Thus, the disc support cylinder is arranged so that it extends in the axial direction from a side of the piston disc that is respectively arranged away from the control chamber like the support elements.

The flat walls include sections that are arranged in the radial direction on an outside so that the piston disc that acts as a closing element is axially supportable so that an axial fluid flow is possible as will be described in more detail infra.

According to an advantageous embodiment the piston discs are made from light metal, advantageously made from aluminum. The piston discs can also be made from other light materials, e.g. from a synthetic material. Using the light material like e.g. the aluminum light metal minimizes a moving weight of the check valves and thus accelerates a response or a reaction of the check valves. Additionally aluminum being a very durable and resilient material provides a very long service life for the check valves.

Furthermore the piston discs are advantageously configured very thin or configured with a very small material thickness. Thus, the piston discs advantageously have a material thickness or a material strength of 1 mm at the most, particularly advantageously of 0.3 mm at the most. The particularly small material thickness of the piston discs is also possible due to the support elements which support or stabilize the piston discs.

A thin configuration of the piston discs provides material and cost savings. Furthermore a weight and a possible friction of the piston discs within the control piston is reduced which further accelerates a response of the check valves.

According to another advantageous embodiment the piston discs are respectively configured with at least three of the support elements, wherein the support elements are respectively configured to conduct a fluid flow. The fluid, in particular a control oil flows with great velocity and/or under high pressure. Thus, the support elements are used for conducting and orienting the fluid flow while avoiding or at least reducing turbulences. Thus, the fluid can flow more quickly so that a switching and control speed of the control valve is increased.

Advantageously the piston discs are applied in a sealing manner with their outer edges to an inner wall of the control piston, wherein the piston discs have a radial seal at outer edges. A sealing contact of the piston discs facilitates an efficient use of the check valves. Thus, the entire fluid flow is directed in predetermined paths and/or directions and an unintentional deviation of a partial flow is prevented. A sealing contact is assured by the radial seal or the sealing device at the outer walls. At this location it is explicitly pointed out that the seal function and a seat of the check valve are arranged separately from each other. Therefore radial sealing is advantageous.

The radial seal is configured for example with a seal ring which is advantageously produced from rubber and particularly advantageously from an elastomeric material.

Advantageously the piston shaft includes at least one inlet opening to the control chamber wherein the inlet opening is arranged so that the fluid of the control chamber is feedable centrally and symmetrically between the check valves. A central a symmetrical feeding into the control chamber or into the space between the check valves provides a uniform and turbulence free inflow and/or flow through of the fluid irrespective of a particular switching position of the control valve. Resulting advantages are a quicker response and a constant and reliable operation of the control valve over all possible switching positions.

Thus, the piston shaft is advantageously configured with a hollow cylinder which includes the inlet opening to the control chamber and a connection opening for connecting with the supply connection. Thus, the connection opening for the supply connection is advantageously arranged at a narrower end of the piston shaft. From the supply connection the fluid is conducted through the connection opening into the hollow cylinder so that fluid can flow into the control chamber. Thus a very simple and therefore barrier free and thus very quick feeding of the fluid to the control valve can be provided.

In a particularly advantageous embodiment the piston shaft is configured so that the second piston disc, the torsion spring, the first piston disc and the control piston are arranged so that they are movable onto the piston shaft in axial sequence. A sliding on in the predetermined sequence makes mounting the control piston device very simple and comfortable. A complicated individual fixing of small components in the control piston is thus avoided. Assembly errors can thus be reduced.

Furthermore a spacer is provided according to one embodiment, wherein the spacer is slid onto the piston shaft and arranged between the first piston disc and the control piston. Thus, a gap or a free portion on the piston shaft is filled, so that the check valves are retained in their predetermined positions. The configuration of the spacer, e.g. its size is adaptable to a requirement of the control piston device in a very simple manner. A complicated adaptation of an inner shape of the control piston is therefore not required.

The spacer is advantageously made from a material that differs from the material of the first check valve. The spacer is thus adaptable to special requirements of the control piston device. Thus, the spacer is made e.g. from an economical material like e.g. steel when cost reduction is a primary focus. Alternatively the spacer is made from a very light material, like e.g. carbon when low total weight is paramount. Overall the spacer provides a very high degree of flexibility for configuring the control piston device with a low level of complexity.

Additionally the spacer is advantageously configured with a first reverse stop for the first check valve. Through this first reverse stop the first check valve or the first piston disc is only movable in one direction thus in a direction towards the torsion spring or away from the spacer. Thus, a check valve function, thus a flow in only one direction is assured. When using the spacer as a first reverse stop a configuration of the control piston with one stop can be omitted. The configuration and mounting the control piston device is therefore simplified significantly.

Thus, the first back stop forms the seat of the first check valve. Therefore a spatial separation between seat and flow through opening exists for the first check valve. Resulting advantages are higher flexibility with respect to a position of the valve seat and less wear at the piston disc.

Accordingly the piston shaft is configured with a second back stop for the second check valve. Thus, the second back stop is implemented by a step configuration of the diameter at the piston shaft. This configuration or shoulder can be integrated into a fabrication process of the piston shaft in a very simple manner and thus assures the valve function of the second check valve. Thus, the second check valve or the second piston disc is only movable in a direction towards the torsion spring and away from the shoulder.

The second back stop thus forms the seat of the second check valve. Thus, a spatial separation of seat and flow through opening is also provided for the second check valve. The resulting advantages as already recited for the first check valve are again increased flexibility with respect to a position of the valve seat and less wear at the piston disc.

For example an additional second spacer can be slid onto the piston shaft in order to provide the shoulder which renders a position or arrangement of the check valves on the piston shaft adjustable after fabrication of the components.

According to an advantageous embodiment the control piston arrangement is movable into a first position and second position and a third position.

Thus the two piston discs are arranged in the control piston so that the first operating connection is closed by the first piston disc for a fluid flow from the control chamber in the first position wherein an inflow of fluid from the first operating connection into the control chamber and to the second operating connection is possible by the check function of the first check valve. Furthermore the two piston discs are arranged in the control piston so that both operating connections are closed in the second position. In a third position the second operating connection is closed by the second piston disc for a fluid flow from the control chamber wherein a flow of fluid from the second operating connection into the control chamber and to the first operating connection is possible through a check function of the second check valve.

Using the three positions, also designated as switching positions a function and purpose of the check valve, namely adjusting a fluid flow are implementable. As already recited supra an adjustment of the cam phaser and thus of the cam shaft into a particular phase orientation is possible as a function of a switching position of the control piston.

According to another advantageous embodiment the first check valve and the second check valve are axially arranged in the control piston and have opposite opening directions. Thus, the check valves are advantageously configured with identical piston discs that are arranged as mirror images of each other on the control pistons.

The torsion spring is arranged between the piston discs so that the piston discs are respectively applied to the torsion springs with sides of the piston discs that are oriented away from the support elements. Thus, both check valves operate with the same torsion spring. This arrangement provides a particularly compact and simple configuration of the control piston device. The number of components is minimized, in this case by the jointly used torsion spring. Furthermore complexity and number of components is minimized, thus by the identical configuration of the first and the second piston disc. Material and fabrication costs is significantly reduced.

The torsion spring is advantageously configured as a compression coil spring in this embodiment like in all preceding and subsequent embodiments. The compression coil spring is loaded by compressing the ends, wherein a force introduction is provided by the end windings. The stored energy is released again when the spring is unloaded which implements the back stop function of the piston discs.

According to another aspect the object is achieved by a method for mounting a control valve according to one of the preceding embodiments. The method has similar advantages as the control valve according to the invention and includes the steps preassembling the control piston device and inserting the control piston device into the housing. This method makes the simple configuration and ease of assembly of the control valve evident. Thus, a completely assembled control piston device can be inserted into the housing as an individual component that is configured herein as a central bolt.

Furthermore preassembling the control piston arrangement advantageously includes the steps providing the piston shaft, sliding the second piston disc onto the piston shaft, sliding the torsion spring onto the piston shaft, sliding the first piston disc onto the piston shaft, sliding the spacer onto the piston shaft and sliding the control piston onto the piston shaft. As stated supra sliding on the individual components in this manner renders the assembly of the control piston device very simple and comfortable. This helps to save time and avoids errors during the assembly of the control piston arrangement.

Furthermore a form locking and fixed connection between the control piston and the piston shaft is formed when by sliding the control piston onto the piston shaft. Thus, the fixed connection is advantageously formed by threading or pressing the piston shaft into the control piston. No additional auxiliary devices are necessary which facilitates a simple and efficient assembly of the control piston device and thus of the control valve.

BRIEF DESCRIPTION OF THE DRAWINGS

Additional advantages of the invention can be derived from the description and the drawing figures. The invention is subsequently described in more detail based on embodiments with reference to drawing figures, wherein.

DETAILED DESCRIPTION OF THE INVENTION

A control valve that is illustrated in FIGS. 1-7 showing individual components is used to adjust a path of a fluid flow and resulting therefrom a phase orientation of a cam phaser or of its rotor.

Figure 1:
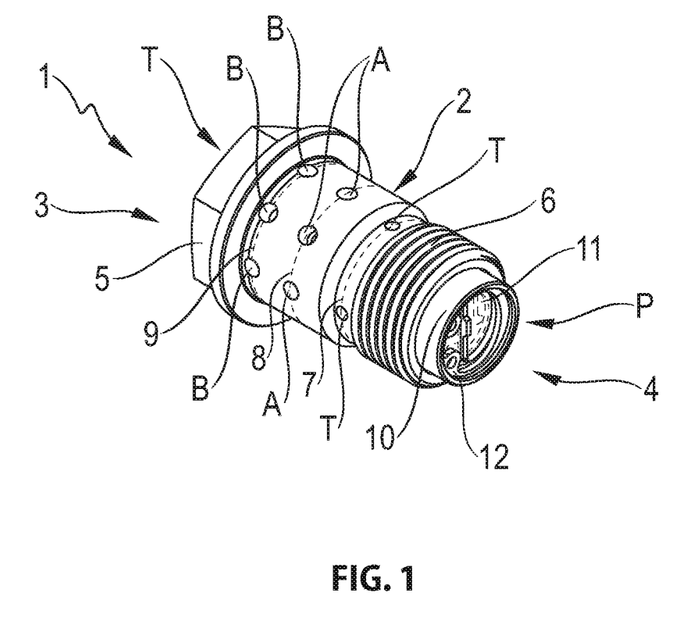
FIG. 1 illustrates a perspective view of a control valve according to the invention.

FIG. 1 illustrates a control valve 1 with a cylindrical housing 2 that is configured herein as a central bolt. The housing 2 includes a head side 3 and an insertion side 4, wherein a hexagonal head 5 is arranged at the head side 3 and an external thread 6 is arranged at the insertion side 4. Furthermore the housing 2 includes numerous openings that are provided as first operating connections A, second operating connections B, supply connection P and tank drain connections T. Thus, the opening at the head side 3 that is not visible in this illustration is a tank drain connection T and the opening at the insertion side 4 is a supply connection P. The openings that are arranged at or in the housing 2 in a radially circumferential manner in a respective hole series 7, 8, 9, thus indicated by dashed lines include an identical connection type. Starting from the insertion side 4 the openings in the first hole row 7 are tank drain connections T, in the second hole row 8 the openings are first operating connections A and in the third hole row 9 the openings are second operating connections B. A calibration cap 10 protrudes from the opening at the insertion side 4 wherein a supply filter 11 is visible in the calibration cap and retained in the calibration cap 10 by a safety ring 12.

The control valve 1 controls a cam phaser and attaches it at the cam shaft. The attachment is performed by threading the housing 2 that is configured as a central bolt and by the hexagonal head 5 arranged at the housing 2 and by the external thread 6. The controlling is performed by the connections A, B, P and T. Thus, a fluid is introduced into the control valve 1 by the supply connection P. The operating connections A and B and fluid flowing out either through the operating connections A or the operating connections B facilitates respectively controlling one respective operating connection of the two operating connections or phase arrangements of the cam phaser. The tank drain connection T is only used for draining superfluous fluid.

Figure 2:
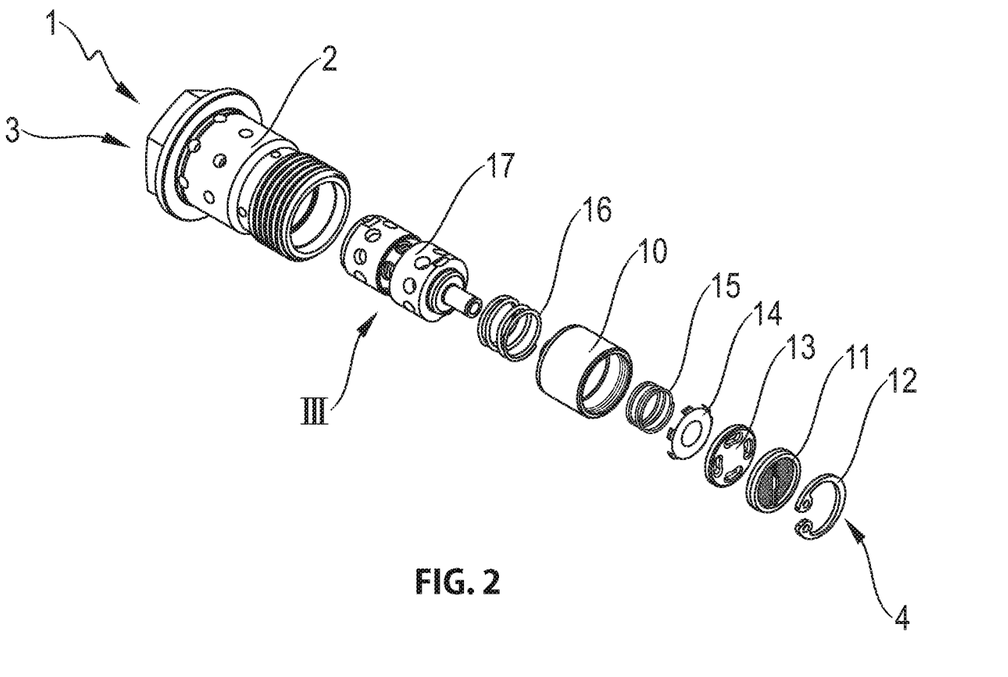
FIG. 2 illustrates a perspective exploded view of the control valve of FIG. 1.

FIG. 2 illustrates a perspective exploded view of the control valve 1 of FIG. 1. The designations head side 3 and insertion side 4 are maintained for this figure and the subsequent figures. Out of the components illustrated in FIG. 1, FIG. 2 illustrates the housing 2, the calibration cap 10, the supply filter 11 and the safety ring 12. Subsequently the components are listed that are lined up between the supply filter 11 and the housing 2 from the insertion side 4 in a direction towards the head side 3. Thus, the control valve 1 also includes a flow plate 13, a return valve 14, a return valve spring 15, the calibration cap 10, a calibration spring 16 and last not least a control piston device 17 according to the invention.

Figure 3:
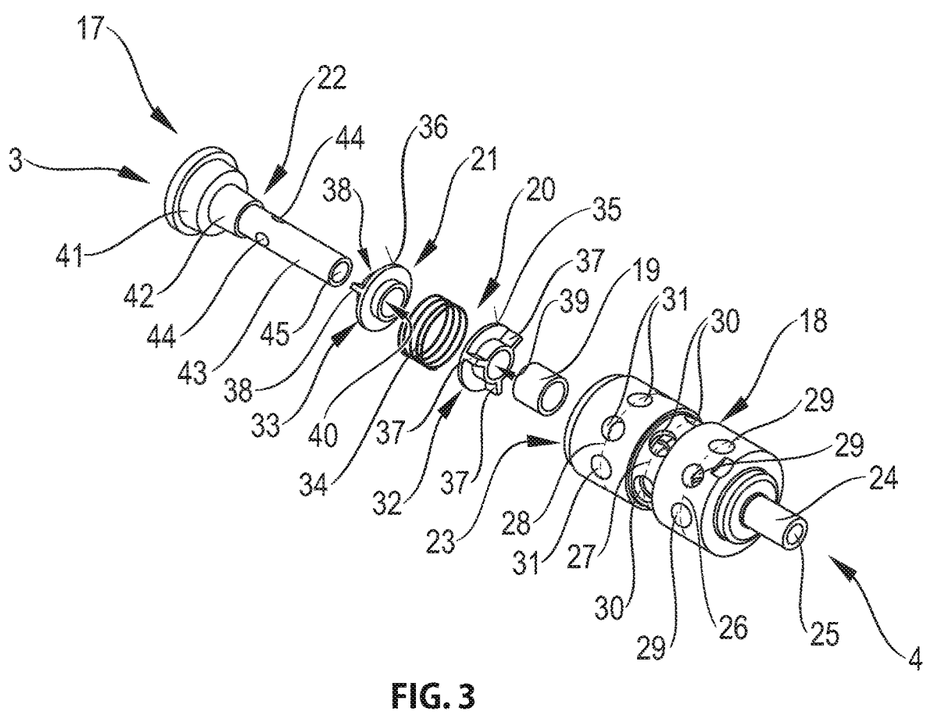
FIG. 3 illustrates a perspective exploded view of detail III of FIG. 2.

FIG. 3 illustrates a perspective exploded view of the control piston device 17 of FIG. 2. Starting from the insertion side 4 and moving towards the head side 3 the control piston device 17 includes a control piston 18, a spacer 19, a first check valve 20, a second check valve 21 and a piston shaft 22.

The control piston 18 includes a non-visible mounting opening 23 on the head side 3 and a supply spout 24 with a supply opening 25 on the insertion side 4. Additionally the control piston 18 like the housing 2 in FIG. 1 also has three hole rows with openings, wherein the hole rows are configured as a fourth hole row 26, a fifth hole row 27 and a sixth hole row 28 and indicated again by dashed lines. Starting from the insertion side 4 the openings in the first hole row 26 are first operating pass through openings 29, in the fifth hole row 27 central pass through openings 30 and in the sixth hole row 28 second operating pass through openings 31.

The check valves 20, 21 are configured with a first piston disc 32, a second piston disc 33 and a torsion spring 34 that is thus configured as a compression coil spring. Thus, the first piston disc 32 with the torsion spring 34 forms the first check valve 20 and the second piston disc 33 with the same torsion spring 34 forms the second check valve 21. Thus, a respective outer edge 35, 36 is arranged at the piston discs 32, 33 and plural support elements 37, 38 are arranged on a side that is oriented away from the torsion spring 34. Thus, the first piston disc 32 is configured with a first outer edge 35 and three first support elements 37 and the second piston disc 33 is configured with a second outer edge 36 and three non-visible second support elements 38. Thus, the first piston disc 32 includes a first disc opening 39 and the second piston disc 33 includes a second disc opening 40.

The piston discs 33, 34 can be configured in the non-illustrated embodiment with additional radial seals or seal elements at the outer edges 35, 36. Additionally the piston discs 32, 33 can also include two, four or more than four support elements 37, 38 instead of three respective support elements 37, 38.

Starting from the head side 3 the piston shaft 22 includes a shaft head 41, a shoulder 42, and a hollow cylinder 43. Inlet openings 44 are arranged at the hollow cylinder 43 in a radially circumferential manner. Additionally the hollow cylinder 43 terminates on the insertion side 4 with a connection opening 45.

Figure 4:
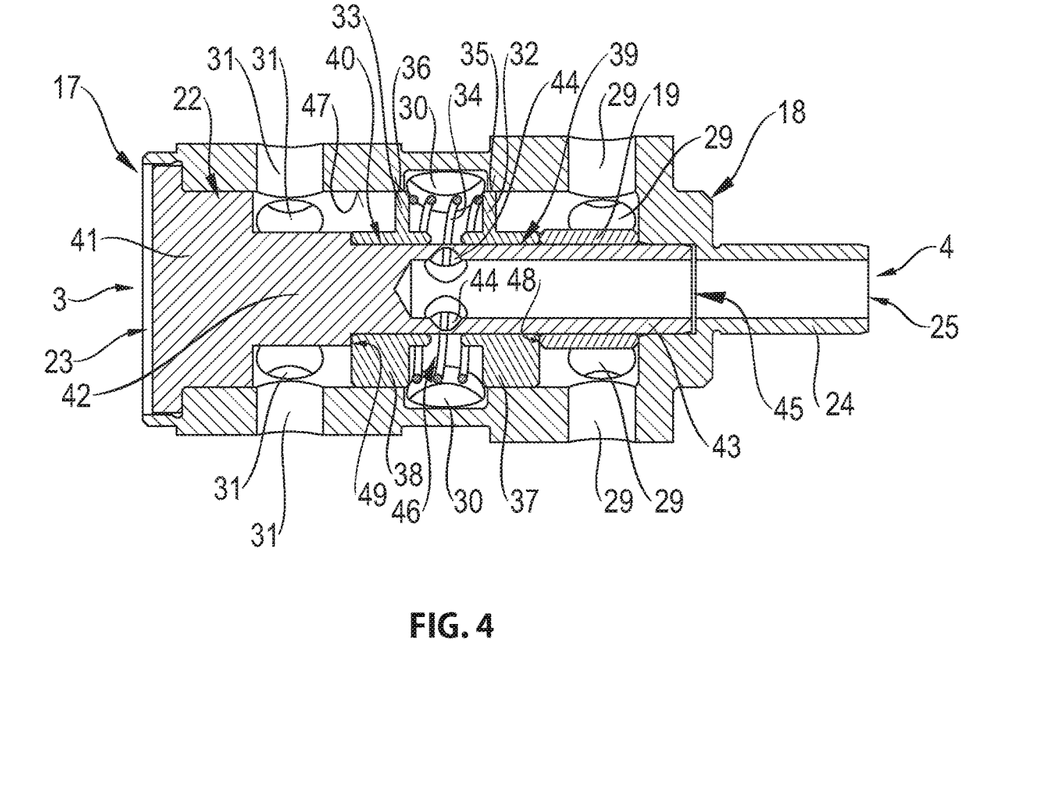
FIG. 4 illustrates a longitudinal sectional view of the control piston device according to FIGS. 2 and 3.

FIG. 4 illustrates a longitudinal sectional view of the control piston device 17 according to FIG. 2 and FIG. 3. All components that are described in FIG. 3 are also visible in FIG. 4 and are not described again. Mounting or sliding on the second piston disc 33, the torsion spring 34 the first piston disc 32, the spacer 19 and the control piston 18 in the recited sequence achieves the illustrated configuration of the control piston device 17. Differently from FIG. 3, FIG. 4 also illustrates the mounting opening 23 on the head side 3 of the control piston 18 which is configured closed tight by the piston shaft 22.

Additionally a control chamber 46 is visible that is formed during the assembly and arranged within the control piston 18 between the piston discs 32, 33 and which is penetrated by the torsion spring 34. Thus, the control chamber 46 is connected in a fluid conducting manner by the central pass through openings 30 with a portion outside of the control piston 18 and connected by inlet openings 44 with the hollow cylinder 43 of the piston shaft 22 in a fluid conducting manner. Thus the hollow cylinder 43 is applied with its connection opening 45 from an inside or from the head side 4 in a form locking manner to the supply spout 24. Additionally FIG. 4 illustrates an inner wall 47 of the control piston 18 and a first back stop 48 at the head side 4 of the spacer 19 and a second back stop 49 at the insertion side 3 of the shoulder 42 of the piston shaft 22.

Figure 5:
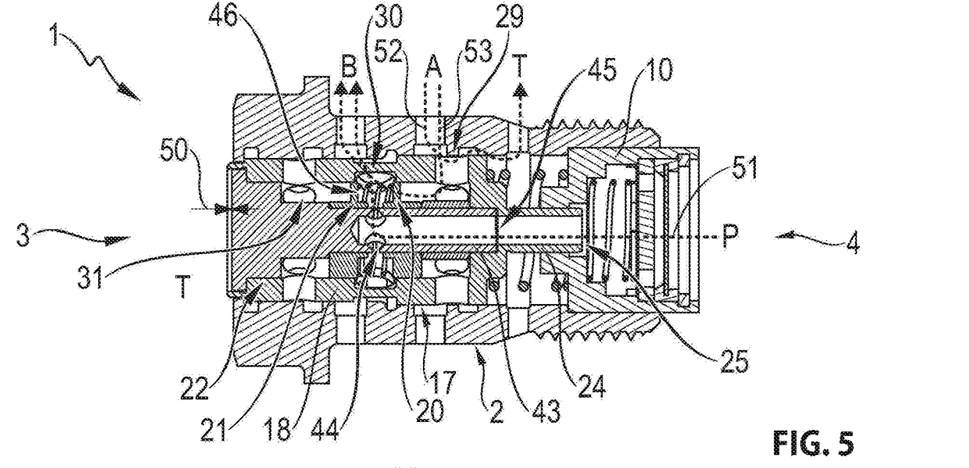
FIG. 5 illustrates longitudinal sectional view of the control valve according to FIG. 1 with the control piston device in a first position.
Figure 6:
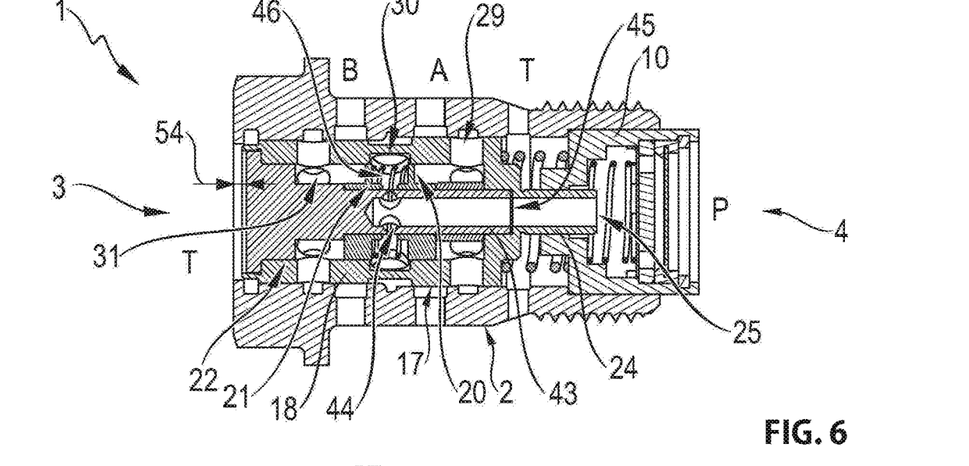
FIG. 6 illustrates a longitudinal sectional view of the control valve according to FIG. 1 with the control piston device in a second position.
Figure 7:
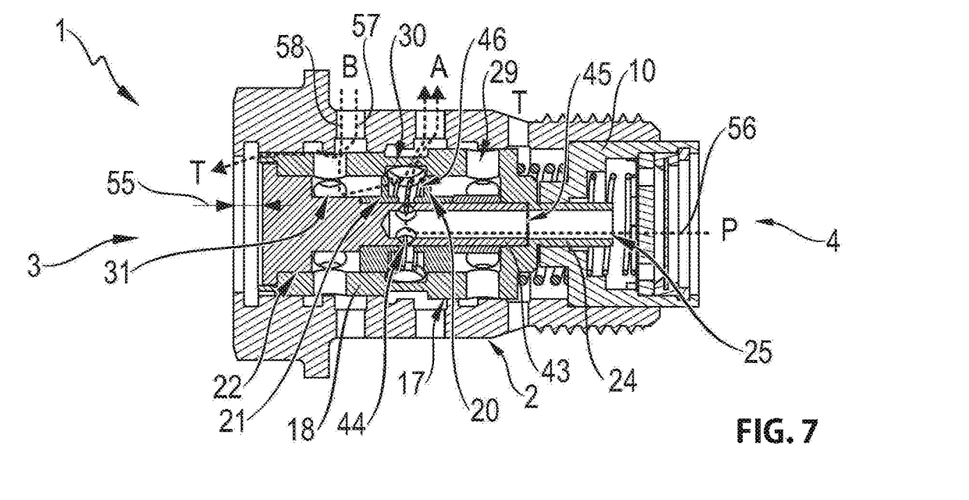
FIG. 7 illustrates a central longitudinal sectional view of the control valve according to FIG. 1 with the control piston device in a third position.

A cooperation of the control piston arrangement 17 with the other components of the control valve 1 is illustrated in detail in subsequent FIGS. 5-7.

The assembly or the joining of the components according to FIG. 2 achieves the configuration of the control valve 1 illustrated in FIGS. 5-7. Thus, the illustrations of the control valve 1 differ in FIGS. 5-7 only in one position of the control piston device 17 in the housing 2. It is appreciated that FIGS. 5-7 only include the reference numerals that are required for the description in order to increase clarity.

FIG. 5 illustrates a longitudinal sectional view of the control valve of FIG. 1 with the control piston device 17 in a first position 50. The position 50 is indicated by two arrows at the head side of the control valve 1 that point towards each other with their arrow tips. Since the position 50 is a starting position no movement has occurred yet or the movement of the control piston device 17 in the housing 2 is 0 mm. The arrow tips are therefore illustrated contacting each other. Due to the position 50 three fluid flows 51, 52, 53 are possible in the control valve wherein the fluid flows are respectively indicated by dashed lines. The dashed lines are respectively configured with an arrow at one end in order to indicate the flow direction of the fluid flows 51, 52, 53. In particular a first fluid flow 51 runs from the supply connection P to the second operating connection B, a second fluid flow 52 runs from the first operating connection A to the second operating connection B, and a third fluid flow 53 runs from the first operating connection A to the radially arranged tank drain connection T. The reference numerals A, B, P, T are illustrated in FIG. 5 for the purpose of clarity only at ends of dashed lines representing the fluid flows 51, 52, 53 and/or at a respective corresponding opening at the housing 2. The mode of illustration used in FIG. 5 also applies for the subsequent FIGS. 6 and 7. Subsequently the exact paths of the fluid flows 51, 53 are described.

The first fluid flow 51 runs from the supply connection P through the calibration cap 10 to the supply spout 24 of the control piston 18 and its supply opening 25. From the supply spout 24 the first fluid flow 51 runs through the connection opening 45 of the piston shaft 22 into its hollow cylinder 43 and subsequently through the inlet opening 44 into the control cavity 46. From the control chamber 46 the first fluid flow 51 runs through the central pass through openings 30 to the second operating connection B.

The second fluid flow 52 runs from the first operating connection A through the first operating pass through openings 29 into the control piston 18 and from there onward through the first check valve 20 into the control chamber 46. From the control chamber 46 the second fluid flow 52 runs together with the first fluid flow 51 through the central pass through openings 30 to the second operating connection B.

The third fluid flow that is a simple drain flow runs only from the first operating connection A in the housing 2 past the control piston 18 to the radially arranged tank drain connection T.

In the illustrated first position 50 of the control piston device 17 the first operating connection A is closed by the first check valve 20 for a fluid that is fed from the control chamber 46. An exit of the fluid from the first operating connection A to the control chamber 46 and from the second operating connection B by a check valve function of the first check valve 20, however is possible.

FIG. 6 illustrates a longitudinal sectional view of the control valve of FIG. 1 with the control piston device 17 in a second position 54. In the second position 54 the control piston device 17 is arranged inserted a little further, thus in particular by 1.5 mm in a direction towards the insertion side 4 into the housing 2. Thus, there are no fluid conducting connections between the connections A, B, P and T. The two operating connections A, B are closed. Thus no possible fluid flows are illustrated.

FIG. 7 illustrates a central longitudinal sectional view of the control valve of FIG. 1 with the control piston device 17 in a third position 55. In the third position 55 the control piston device 17 is inserted a little bit further, in particular by an additional 1.5 mm or overall by 3 mm in a direction of the insertion side 4 into the housing 2. Due to the position 55, three fluid flows 56, 57, 58 are possible in the control valve which are designated herein as fourth fluid flow 56, fifth fluid flow 57 and sixth fluid flow 58. In particular the fourth fluid flow 56 runs in FIG. 7 from the supply connection P to the first operating connection A, the fifth fluid flow 57 runs from the second operating connection B to the first operating connection A and the sixth fluid flow 58 runs from the second operating connection B to the tank drain connection T arranged at the head side 3. Subsequently exact paths of the fluid flows 56, 57, 58 are described.

The fourth fluid flow 56 runs from the supply connection P initially to the control chamber 46 like the first fluid flow 51 of FIG. 5. However, the fourth fluid flow 56 runs from the control chamber 46 through the central pass through openings 30 to the first operating connection A.

The fifth fluid flow 57 runs from the second operating connection B through the second operating pass through openings 31 into the control piston 18 and from there through the second check valve 21 into the control chamber 46. From the control chamber 46 the fifth fluid flow 57 runs together with the fourth fluid flow 56 through the central pass through openings 30 to the first operating connection A.

The sixth fluid flow 58 is a simple drain flow and runs only from the second operating connection B in the housing 2 past the control piston 18 to the tank drain connection T at the head side 3.

In the illustrated third position of the control piston device 17 the second operating connection B is closed by the second check valve 21 for a fluid that is fed by the control chamber 46. However, an exit of fluid from the second operating connection B to the control chamber 46 and the first operating connection A is possible due to a check function of the second check valve 21.

Figure 8:
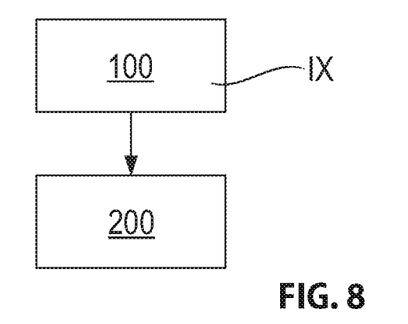
FIG. 8 illustrates a flow diagram of a method according to the invention for assembling a control valve.

FIG. 8 illustrates a flow chart of a method according to the invention for assembling a control valve 1 according to FIGS. 1-7. The method includes preassembling 100 a control piston device according to the invention and inserting 200 the control piston device into a housing.

Figure 9:
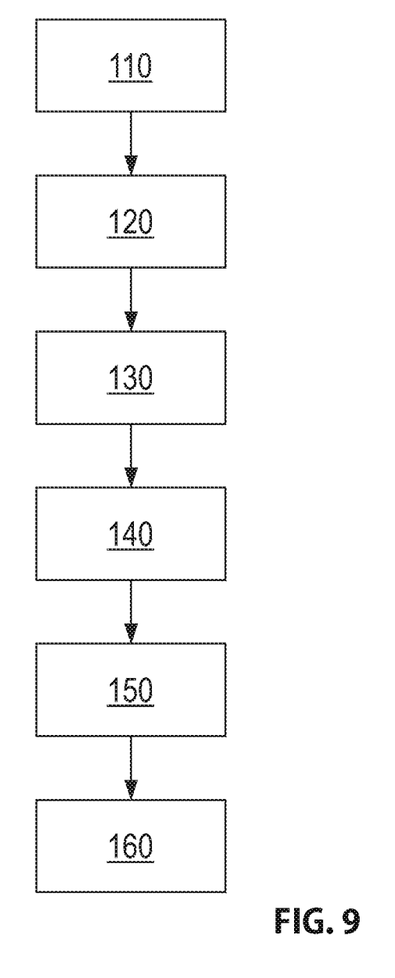
FIG. 9 illustrates a flow diagram for detail IX according to FIG. 8.

FIG. 9 illustrates a detail view IX of the flow diagram of the method according to FIG. 8. These are individual steps for preassembling 100 of the control piston device according to the invention. They include providing 110 a piston shaft, sliding 120 a second piston disc onto the piston shaft, sliding 130 a torsion spring onto the piston shaft, sliding 140 a first piston disc onto the piston shaft, sliding 150 a spacer onto the piston shaft and sliding 160 a control piston onto the piston shaft. When sliding 160 the control piston onto the piston shaft a form locking and fixed connection is formed between the control piston and the piston shaft which is not disengageable unintentionally.

The individual step of sliding 150 the spacer onto the piston shaft is optional. An alternative method according to the invention that is not illustrated only includes the steps 100, 200 of FIG. 8 and the individual steps 110, 120, 130, 140, 160 of FIG. 9.

What is claimed is:

1. A control valve for a cam phaser of an internal combustion engine, the control valve comprising:

a cylindrical housing, including a first operating connection, a second operating connection, a supply connection, and a tank drain connection configured to drain a hydraulic fluid;

a control piston device, including a control piston, a piston shaft, a first check valve, and a second check valve, wherein the control piston device is arranged in the housing and movable by an actuator in an axial direction of the housing, wherein the first check valve is configured with a first piston disc and the second check valve is configured with a second piston disc and the first piston disc and the second piston disc are arranged offset from each other by a compression spring so that a control chamber is formed between the first piston disc and the second piston disc, wherein the first piston disc and the second piston disc are respectively configured with at least two support elements, wherein the at least two support elements extend in the axial direction from a side of the first piston disc and the second piston disc that is respectively oriented away from the control chamber, and wherein the at least two support elements support a linear movement of the first piston disc and the second piston disc in the control piston, wherein the first piston disc and the second piston disc are applied with respective outer edges in a sealing manner to an inner wall of the control piston, and wherein the first piston disc and the second piston disc each provide radial sealing at the respective outer edges, wherein the piston shaft includes at least one inlet opening to the control chamber, and wherein the at least one inlet opening is arranged so that the hydraulic fluid is feedable to the control chamber centrally and symmetrically between the first check valve and the second check valve.

2. The control valve according to claim 1, wherein the first piston disc and the second piston disc are made from light metal or from aluminum.

3. The control valve according to claim 1,
wherein the first piston disc and the second piston disc are respectively configured with at least three support elements of the at least two support elements, and
wherein the at least three support elements are respectively configured to conduct a fluid flow.

4. The control valve according to claim 1, wherein the piston shaft is configured with a hollow cylinder which includes the at least one inlet opening to the control chamber and a connection opening that connects with the supply connection.

5. The control valve according to claim 1, wherein the piston shaft is configured so that the second piston disc, the compression spring, the first piston disc and the control piston are arranged so that they are sequentially slidable onto the piston shaft in the axial direction.

6. The control valve according to claim 1, wherein a spacer is provided that is slid onto the piston shaft and arranged between the first piston disc and the control piston.

7. The control valve according to claim 6, wherein the spacer is configured with a first back stop for the first check valve.

8. The control valve according to claim 1, wherein the piston shaft is configured with a second back stop for the second check valve.

9. A method for assembling the control valve according to claim 1, the method comprising the steps:

preassembling the control piston device; and
inserting the control piston device into the housing.

10. The method according to claim 9, wherein the preassembling of the control piston device includes the steps:
providing the piston shaft;
sliding the second piston disc onto the piston shaft;
sliding the compression spring onto the piston shaft;
sliding the first piston disc onto the piston shaft;
sliding the spacer onto the piston shaft; and
sliding the control piston onto the piston shaft.

11. The method according to claim 10, wherein the sliding of the control piston onto the piston shaft forms a locked and fixed connection between the control piston and the piston shaft.

12. A control valve for a cam phaser of an internal combustion engine, the control valve comprising:
a cylindrical housing, including a first operating connection, a second operating connection, a supply connection, and a tank drain connection configured to drain a hydraulic fluid;
a control piston device including a control piston, a piston shaft, a first check valve, and a second check valve, wherein the control piston device is arranged in the housing and movable by an actuator in an axial direction of the housing,
wherein the first check valve is configured with a first piston disc and the second check valve is configured with a second piston disc and the first piston disc and the second piston disc are arranged offset from each other by a compression spring so that a control chamber is formed between the first piston disc and the second piston disc,
wherein the first piston disc and the second piston disc are respectively configured with at least two support elements,
wherein the at least two support elements extend in the axial direction from a side of the first piston disc and the second piston disc that is respectively oriented away from the control chamber, and
wherein the at least two support elements support a linear movement of the first piston disc and the second piston disc in the control piston,
wherein the control piston device is configured movable into a first position, a second position, and a third position,
wherein the first operating connection is closed by the first piston disc for a fluid from the control chamber in the first position, wherein a flow of the fluid from the first operating connection into the control chamber and to the second operating connection is enabled by a check function of the first check valve,
wherein the first operating connection and the second operating connection are closed in the second position, and
wherein the second operating connection is closed by the second piston disc for a hydraulic fluid from the control chamber in the third position, wherein a flow of the hydraulic fluid from the second operating connection into the control chamber and to the first operating connection is enabled by a check function of the second check valve, wherein the piston shaft includes at least one inlet opening to the control chamber, and wherein the at least one inlet opening is arranged so that the hydraulic fluid is feedable to the control chamber centrally and symmetrically between the first check valve and the second check valve.

13. A control valve for a cam phaser of an internal combustion engine, the control valve comprising:
a cylindrical housing, including a first operating connection, a second operating connection, a supply connection, and a tank drain connection configured to drain a hydraulic fluid;
a control piston device, including a control piston, a piston shaft, a first check valve, and a second check valve, wherein the control piston device is arranged in the housing and movable by an actuator in an axial direction of the housing,
wherein the first check valve is configured with a first piston disc and the second check valve is configured with a second piston disc and the first piston disc and the second piston disc are arranged offset from each other by a compression spring so that a control chamber is formed between the first piston disc and the second piston disc,
wherein the first piston disc and the second piston disc are respectively configured with at least two support elements,
wherein the at least two support elements extend in the axial direction from a side of the first piston disc and the second piston disc that is respectively oriented away from the control chamber,
wherein the at least two support elements support a linear movement of the first piston disc and the second piston disc in the control piston, and
wherein the first check valve and the second check valve are axially arranged in the control piston and have opposite opening directions, wherein the piston shaft includes at least one inlet opening to the control chamber, and wherein the at least one inlet opening is arranged so that the hydraulic fluid is feedable to the control chamber centrally and symmetrically between the first check valve and the second check valve.

* * * * *